(12) United States Patent
Hong et al.

(10) Patent No.: US 9,512,300 B2
(45) Date of Patent: Dec. 6, 2016

(54) THERMOPLASTIC RESIN COMPOSITION FOR AUTOMOBILES AND MOLDED PRODUCT PRODUCED FROM THE SAME

(71) Applicant: Samsung SDI Co., Ltd., Yongin-si (KR)

(72) Inventors: Chang Min Hong, Uiwang-si (KR); Jaeyoup Chung, Uiwang-si (KR); Hyoungtaek Kang, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/725,673

(22) Filed: May 29, 2015

(65) Prior Publication Data

US 2015/0344674 A1   Dec. 3, 2015

(30) Foreign Application Priority Data

Jun. 2, 2014 (KR) .................. 10-2014-0067152

(51) Int. Cl.
*C08K 3/10* (2006.01)
*C08K 7/14* (2006.01)
*C08K 3/16* (2006.01)
*C08K 3/34* (2006.01)
*C08K 3/22* (2006.01)

(52) U.S. Cl.
CPC . *C08K 7/14* (2013.01); *C08K 3/16* (2013.01); *C08K 3/34* (2013.01); *C08K 2201/006* (2013.01)

(58) Field of Classification Search
CPC ................. C08K 7/14; C08K 3/16; C08J 5/00
USPC ........................................... 524/413
See application file for complete search history.

(56) References Cited

U.S. PATENT DOCUMENTS

2012/0172521 A1* 7/2012 Touraud .............. C08G 69/265
                                                   524/606
2013/0253115 A1* 9/2013 Jeol .......................... C08L 77/06
                                                   524/387

* cited by examiner

*Primary Examiner* — Terressa Boykin
(74) *Attorney, Agent, or Firm* — Additon, Higgins & Pendleton, P.A.

(57) ABSTRACT

A thermoplastic resin composition for automobiles including about 40 to about 80 weight % semi-aromatic polyamide resin; about 0.1 to about 1 weight % copper halide thermal stabilizer; about 0.1 to about 5 weight % zeolite; and about 15 to about 55 weight % glass fiber.

11 Claims, No Drawings

THERMOPLASTIC RESIN COMPOSITION FOR AUTOMOBILES AND MOLDED PRODUCT PRODUCED FROM THE SAME

CROSS-REFERENCE TO RELATED APPLICATION

This application claims the benefit of priority under 35 U.S.C. §119(a) of Korean Patent Application No. 10-2014-0067152, filed on Jun. 2, 2014, in the Korean Intellectual Property Office, the entire disclosure of which is incorporated herein by reference for all purposes.

FIELD

Various embodiments of the present invention relate to a thermoplastic resin composition for automobiles.

BACKGROUND

Polyamide resin is widely used in various fields including electrical components, electronics components, and automobile components due to its excellent heat resistance, wear resistance, chemical resistance, and flame retardancy.

Due to the recent trend towards weight reduction in the automobile field, metal components are being replaced by plastic components. Polyamide resin compositions having excellent heat resistance have been used for engine rooms in automobiles which are under the hood areas that are exposed to high temperature environments for long periods of time.

In the automobile field, engines are being down-sized to increase fuel efficiency, leading to an increase of vehicles having turbo chargers.

In the case of an automobile using a turbo charger, the temperature inside the under hood increases more rapidly than conventional automobiles when high-powered. Thus, there is a growing need for materials having higher heat resistance for use in components that will be installed inside the under hood so that they can withstand the high temperature environment for long periods of time.

Furthermore, due to the problem that polyamide resin tends to have a low hydrolysis resistance, there are continued efforts to improve the hydrolysis resistance thereof.

Generally, to improve the hydrolysis resistance of polyamide resin, a method of adjusting the contents of amine and acid of an end of polyamide resin is used. This method, however, has limitations in improving properties at high temperatures for long periods of time to a satisfactory level.

A method of adding a carbodiimide additive to an aliphatic polyamide resin has been commonly used. Although this method may realize excellent effects in aliphatic polyamide resins that do not have high heat resistance, it cannot be easily applied to polyamide resins having high heat resistance due to the low heat resistance of the carbodiimide additive.

Therefore, there is a need for a polyamide resin composition having excellent hydrolysis resistance and also having resistance to gasoline, engine oil, and/or calcium chloride solution while maintaining high thermal stability even when exposed to high temperature environments for long periods of time.

SUMMARY

Therefore, a purpose of various embodiments of the present disclosure is to resolve the aforementioned problems of conventional technology, that is, to provide a thermoplastic resin composition for automobiles that can maintain excellent thermal stability and hydrolysis resistance stably for long periods of time.

An embodiment of the present disclosure provides a thermoplastic resin composition for automobiles, the composition including about 40 to about 80 weight % semi-aromatic polyamide resin; about 0.1 to about 1 weight % copper halide thermal stabilizer; about 0.1 to about 5 weight % zeolite; and about 15 to about 55 weight % glass fiber, each based on the total weight (100 weight %) of the semi-aromatic polyamide resin, copper halide thermal stabilizer, zeolite and glass fiber.

The semi-aromatic polyamide resin may include a repeat unit including a dicarboxylic acid unit including about 10 to about 100 mol % aromatic dicarboxylic acid and an aliphatic and/or alicyclic diamine unit.

The semi-aromatic polyamide resin may include at least one of a polyamide (PA6T/66) including hexamethylene terephthalamide and hexamethylene adipamide, and/or a polyamide (PA6T/DT) including hexamethylene terephthalamide and 2-methylpentamethylene terephthalamide.

The semi-aromatic polyamide resin may have a glass transition temperature (Tg) of about 110 to about 160° C.

A weight ratio of the copper halide thermal stabilizer to the zeolite may be about 1:2 to about 1:15.

The copper halide thermal stabilizer may include at least one selected from the group consisting of copper chloride (I), copper bromide (I), copper iodide (I), copper chloride (II), copper bromide (II), and copper iodide (II).

The zeolite may a specific surface area of about 300 to about 1,200 m$^2$/g.

The thermoplastic resin composition may have a tensile strength $a_1$, with respect to an initial tensile strength $a_0$, measured according to ASTM D638, after being dipped into a mixture solution including a 50:50 volume ratio of ethylene glycol and water at 130° C. and left for 500 hours, expressed by formula 1:

$$75 \leq \frac{a_1}{a_0} \times 100 \leq 100 \qquad \text{[Formula 1]}$$

The thermoplastic resin composition may have a tensile strength tensile strength $a_2$, with respect to an initial tensile strength $a_0$, measured according to ASTM D638, after being dipped into a mixture solution including a 50:50 volume ratio of ethylene glycol and water at 220° C. and left for 500 hours, expressed by formula 2:

$$55 \leq \frac{a_2}{a_0} \times 100 \leq 100 \qquad \text{[Formula 2]}$$

Another embodiment of the present disclosure provides a molded product for automobiles produced from the aforementioned thermoplastic resin composition.

The molded product may be at least a component inside an under hood.

The molded product may be a battery fuse, turbo resonator, and/or intercooler tank.

The aforementioned thermoplastic resin composition for automobiles according to the embodiments of the present disclosure can provide an advantage of maintaining its excellent mechanical strength stably at high temperatures for long periods of time, and thus can provide excellent long term thermal stability.

Furthermore, the thermoplastic resin composition of the present disclosure can maintain its excellent mechanical strength without being decomposed by long term exposure to gasoline, engine oil, calcium chloride solution, and/or cooling water, and thus can provide excellent long term hydrolysis resistance.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinbelow, explanation will be made of a thermoplastic resin composition according to embodiments of the present disclosure.

The thermoplastic resin composition according to an embodiment of the present disclosure may include a semi-aromatic polyamide resin, copper halide thermal stabilizer, zeolite, and glass fiber.

Hereinbelow, explanation will be made in detail on each of the components that forms the thermoplastic resin composition according to embodiments of the present disclosure.

Semi-Aromatic Polyamide Resin

The semi-aromatic polyamide resin may be a semi-aromatic polyamide resin having high heat resistance.

The semi-aromatic polyamide resin may be a polymer, a copolymer, or a (co)polymer blend of two or more (co)polymers formed from a monomer containing an aromatic radical. Herein, the copolymer blend means a polyamide having two or more repeat units of amide and/or diamide molecules.

The semi-aromatic polyamide resin has a structure wherein its main chain includes an aromatic compound. This semi-aromatic polyamide resin may be produced by a condensation polymerization of a dicarboxylic acid monomer that includes about 10 to about 100 mol % aromatic dicarboxylic acid and a monomer that includes a C4 to C20 aliphatic diamine and/or a C4 to C20 alicyclic diamine.

In some embodiments, the dicarboxylic acid monomer may include aromatic dicarboxylic acid in an amount about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of aromatic carboxylic acid can be in a range from about any of the foregoing amounts to about any other of the foregoing amounts.

Examples of the dicarboxylic acid monomer may include without limitation terephthalic acid and/or isophthalic acid including an aromatic benzene ring in its molecules.

In order words, a repeat unit of the semi-aromatic polyamide resin may include a dicarboxylic acid unit and an aliphatic and/or alicyclic diamine unit, the dicarboxylic acid unit including about 10 to about 100 mol % aromatic dicarboxylic acid.

The dicarboxylic acid unit may be derived from, for example terephthalic acid, isophthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like, and mixtures thereof.

The dicarboxylic acid unit may further include a unit derived from a nonaromatic dicarboxylic acid in addition to the aromatic dicarboxylic acid. The nonaromatic dicarboxylic acid may be an aliphatic and/or alicyclic dicarboxylic acid. For example, the nonaromatic dicarboxylic acid may be derived from an aliphatic dicarboxylic acid such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, and/or suberic acid; and/or an alicyclic dicarboxylic acid such as 1,3-cyclophentanedicarboxylic acid, 1,4-cyclohexanedicarboxylic acid, and the like, and mixtures thereof.

The nonaromatic dicarboxylic acid may be used singly or in a mixture of two or more thereof.

The dicarboxylic acid unit may include the nonaromatic dicarboxylic acid in an amount of about 90 mol % or less, for example about 80 mol % or less, about 70 mol % or less, or about 60 mol % or less. In some embodiments, the dicarboxylic acid unit may include nonaromatic dicarboxylic acid in an amount of 0 (the nonaromatic dicarboxylic acid is not present), about 0 (the nonaromatic dicarboxylic acid is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 weight %. Further, according to some embodiments of the present invention, the amount of the nonaromatic dicarboxylic acid can be in a range from about any of the foregoing amounts to about any other of the foregoing amounts.

The aliphatic diamine unit may be derived from an aliphatic alkylene diamine including 4 to 18 carbon numbers. Examples of the C4 to C18 aliphatic alkylene diamine may include without limitation linear aliphatic alkylene diamines such as 1,6-hexanediamine, 1,7-heptanediamine, 1,8-octanediamine, 1,9-nonanediamine, 1,10-decanediamine, 1,11-undecanediamine, and/or 1,12-dodecanediamine; and/or branched aliphatic alkylene diamines such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and/or 5-methyl-1,9-nonanediamine.

The aliphatic diamine unit may be derived from one or more type of diamines such as but not limited to 1,6-hexanediamine, 1,7-heptanediamine, 1,10-decanediamine, 1,11-undecanediamine, 1,12-dodecanediamine, 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, and/or 2,5-dimethyl-1,7-heptanediamine.

The semi-aromatic polyamide resin may include a polyamide (PA6T/66) including hexamethylene terephthalamide and hexamethylene adipamide; a polyamide (PA6T/DT) including hexamethylene terephthalamide and 2-methylpentamethylene terephthalamide; and the like, and combinations thereof. In exemplary embodiments, the polyamide (PA6T/DT) including hexamethylene terephthalamide and 2-methylpentamethylene terephthalamide may be used.

The semi-aromatic polyamide resin is a resin that may exhibit high heat resistance characteristics, and the glass transition temperature (Tg) of the semi-aromatic polyamide resin may be about 110 to about 160° C., for example about 130 to about 150° C.

There is no particular limitation to the molecular weight of the semi-aromatic polyamide resin as long as it has an intrinsic viscosity (IV) of about 0.75 or more, for example about 0.75 to about 1.15.

The thermoplastic resin composition may include the semi-aromatic polyamide resin in an amount of about 40 to about 80 weight %, for example about 50 to about 75 weight %, based on the total weight (100 weight %) of the semi-aromatic polyamide resin, copper halide thermal stabilizer, zeolite and glass fiber. In some embodiments, the thermoplastic resin composition may include the semi-aromatic polyamide resin in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 weight %. Further, according to some embodiments of the present invention, the amount of the semi-aromatic polyamide resin can be in a range from about any of the foregoing amounts to about any other of the foregoing amounts.

When the semi-aromatic polyamide resin is present in an amount of less than about 40 weight %, the heat resistance can deteriorate significantly, making it difficult to use the composition in peripheral components of an automobile engine room. When the semi-aromatic polyamide resin is present in an amount exceeding about 80 weight %, there can be limitations in the hydrolysis resistance.

Copper Halide Thermal Stabilizer

Copper halide thermal stabilizer can provide long term heat resistance to the thermoplastic resin composition.

Examples of the copper halide thermal stabilizer may include without limitation copper chloride (I), copper bromide (I), copper iodide (I), copper chloride (II), copper bromide (II), copper iodide (II), and the like, and combinations thereof.

The copper halide thermal stabilizer may be used together with an alkali metal halide. Examples of the alkali metal halide may include without limitation lithium chloride, lithium bromide, lithium iodide, sodium fluoride, sodium chloride, sodium bromide, sodium iodide, potassium fluoride, potassium chloride, potassium bromide, potassium iodide, and the like, and combinations thereof.

The thermoplastic resin composition may include the copper halide thermal stabilizer in an amount of about 0.1 to about 1 weight %, for example about 0.1 to about 0.7 weight %, based on the total weight (100 weight %) of the semi-aromatic polyamide resin, copper halide thermal stabilizer, zeolite and glass fiber. In some embodiments, the thermoplastic resin composition may include the copper halide thermal stabilizer in an amount of about 0.1, 0.2, 0.3, 0.4, 0.5, 0.6, 0.7, 0.8, 0.9, or 1 weight %. Further, according to some embodiments of the present invention, the amount of the copper halide thermal stabilizer can be in a range from about any of the foregoing amounts to about any other of the foregoing amounts.

When the copper halide thermal stabilizer is present in an amount outside the aforementioned range, the long term thermal stability can be deteriorated or can be small.

Zeolite

Zeolite is a type of aluminum silicate mineral including alkali and/or alkaline earth metals, of which a structure of a tetrahedron of $(Si, Al)O_4$ is bound in a three-dimensional net with a chemical formula 1 shown below.

$$M_{2/n}O \cdot Al_2O_3 \cdot xSiO_2 \cdot yH_2O \quad \text{[Chemical Formula 1]}$$

(Herein, M is a monovalent or divalent metal of which ion is exchangeable, n is an atomic valence of a metal expressed as M, x is a silica coefficient, and y is a number of water of crystallization)

x which is the Si/Al ratio may be 5 to 70, for example 10 to 50.

The zeolite may be, without limitation to the type, a natural zeolite and/or synthetic zeolite. In exemplary embodiments, the type of the zeolite used may be an A type zeolite having a D4R structure, and/or an X, Y type zeolite having a D6R structure, for example a 5A type.

The zeolite includes a plurality of pores which may be microporous. A zeolite particle may have an average diameter of about 2 to about 10 μm, and the size area of the pore may be about 5 to about 30% of the cross-section of the particle.

The higher the specific surface area of the zeolite, the more excellent the long term hydrolysis resistance becomes. In exemplary embodiments, the zeolite can have a specific surface area of about 300 to about 1,200 m²/g, for example about 800 to about 1,000 m²/g.

Due to the three-dimensional net structure, zeolite may absorb ionic materials to reduce the precipitation of copper, thereby preventing deterioration of the properties of the thermoplastic resin composition itself, and may restrict or limit an increase of an end radical (—COOH) of the polyamide resin, thereby increasing the long term thermal stability at high temperatures.

The thermoplastic resin composition may include the zeolite in an amount of about 0.1 to about 5 weight %, for example about 0.2 to about 3 weight %, based on the total weight (100 weight %) of the semi-aromatic polyamide resin, copper halide thermal stabilizer, zeolite, and glass fiber. In some embodiments, the thermoplastic resin composition may include the zeolite in an amount of about 0.1, 0.2, 0.3, 0.4, 0.5, 0.6, 0.7, 0.8, 0.9, 1, 2, 3, 4, or 5 weight %. Further, according to some embodiments of the present invention, the amount of the zeolite can be in a range from about any of the foregoing amounts to about any other of the foregoing amounts.

When the zeolite is added in an amount within the aforementioned range together with the copper halide thermal stabilizer, the long term thermal stability can increase with minimal or no damage of properties such as mechanical strength, and can provide excellent hydrolysis resistance.

The weight ratio of the copper halide thermal stabilizer to the zeolite may be about 1:2 to about 1:15, for example about 1:2 to about 1:10. When the weight ratio is less than about 1:2, the long term thermal stability can decrease, and a foaming phenomenon can occur when producing a molded product using the thermoplastic resin composition, thereby deteriorating the properties. When the weight ratio exceeds about 1:15, there may be no improvement in the hydrolysis resistance, and processability and input stability can decrease, thereby reducing process efficiency.

That is, by using zeolite, it is possible to not only further improve thermal stability caused by the copper halide thermal stabilizer but also realize excellent hydrolysis resistance with minimal or no deterioration of other mechanical properties.

Glass Fiber

The thermoplastic resin composition for automobiles of the present disclosure may include glass fiber. It can be possible to secure a desired level of mechanical strength by adjusting the amount of the glass fiber.

The diameter of the glass fiber may be about 8 to about 20 μm, and the length of the glass fiber may be about 1.5 to about 8 mm. When the diameter is within the aforementioned range, it is possible to obtain excellent strength reinforcement effects, and when the length is within the aforementioned range, the glass fiber may be easily put into a processing device such as an extruder, and the strength reinforcement effects may be significantly improved.

The glass fiber may be mixed with another fiber that is not the same as the glass fiber. Examples of the other fiber can include without limitation carbon fiber, basalt fiber, fiber produced from biomass, and the like, and combinations thereof, and then used in the present disclosure. Biomass means plants and/or organisms that use microorganisms as energy source.

The cross-section of the glass fiber used in the present disclosure may be circular, oval, rectangular, and/or a dumbbell shape including two connected circles.

The aspect ratio of the cross-section of the glass fiber used in the present disclosure may be less than about 1.5. For example, the glass fiber may have a circular cross-section with an aspect ratio of about 1. Herein, the aspect ratio is defined as the ratio of the longest diameter to the shortest diameter. When using glass fiber of the aforementioned aspect ratio range, it is possible to reduce the unit cost of the product, and by using glass fiber having a circular cross-section, it is possible to improve dimensional stability and appearance.

The glass fiber may be surface treated to include a predetermined glass fiber treatment agent in order to prevent the glass fiber from reacting with the resin and to improve the degree of impregnation. Such surface treatment of the glass fiber may be performed when producing the glass fiber or in a subsequent process.

The thermoplastic resin composition may include the glass fiber in an amount of about 15 to about 55 weight %, for example about 20 to about 45 weight %, based on the total weight (100 weight %) of the semi-aromatic polyamide resin, copper halide thermal stabilizer, zeolite, and glass fiber. In some embodiments, the thermoplastic resin composition may include the glass fiber in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55 weight %. Further, according to some embodiments of the present invention, the amount of the glass fiber can be in a range from about any of the foregoing amounts to about any other of the foregoing amounts.

According to an embodiment of the present disclosure, the thermoplastic resin composition for automobiles may further include an additive depending on usage.

Examples of the additive may include, without limitation, a dye, pigment, filler (except for glass fiber), UV stabilizer, lubricant, antimicrobial, release agent, nucleating agent, antistatic agent, antistatic agent, and/or inorganic additive. These may be used singly or in a mixture of two or more thereof.

In the aforementioned thermoplastic resin composition for automobiles, the copper halide thermal stabilizer and zeolite are used together, and thus the composition can exhibit excellent long term hydrolysis resistance and long term thermal stability. Even with the zeolite, wear resistance, chemical resistance, flame retardant, and/or other properties such as mechanical strength of the composition may be minimally or not deteriorated.

The thermoplastic resin composition for automobiles according to the embodiment of the present disclosure may have a tensile strength $a_1$, based on (as a percentage of) an initial tensile strength $a_0$, measured according to ASTM D638, after being dipped into a mixture solution including a volume ratio of 50:50 ethylene glycol and water at 130° C. for 500 hours, expressed by formula 1 below.

$$75 \leq \frac{a_1}{a_0} \times 100 \leq 100 \qquad \text{[Formula 1]}$$

The thermoplastic resin composition for automobiles according to an embodiment of the present disclosure may have a tensile strength $a_2$, based on (as a percentage of) an initial tensile strength $a_0$, measured according to ASTM D638 after being left at 220° C. for 500 hours, expressed by formula 2 below.

$$55 \leq \frac{a_2}{a_0} \times 100 \leq 100 \qquad \text{[Formula 2]}$$

The thermoplastic resin composition according to the present disclosure may be produced by a well known method. For example, it may be produced in a pellet form by mixing the components of the present disclosure and optional additives at the same time, and then melting and extruding them in an extruder.

The thermoplastic resin composition for automobiles may be applied to any type of molded product that requires long term thermal stability and hydrolysis resistance at the same time.

For example, the thermoplastic resin composition may be applied to any type of molded product that requires the above characteristics, for example a molded product for automobiles, including without limitation a component inside an under hood of an automobile. For example, it may be applied to, without limitation, a battery fuse, turbo resonator, and/or intercooler tank that are peripheral components of an engine room.

Examples

Hereinbelow are examples that include test results to prove the excellent effects of the thermoplastic resin composition of the present disclosure.

Components used for the thermoplastic resin composition of the embodiments and comparative examples are as follows.
(a) Semi-Aromatic Polyamide Resin
(a-1) HTN 501, a PA6T/DT product of DuPont Company having a polyamide glass transition temperature (Tg) of 140° C., is used.
(a-2) PA6T/DT product having a glass transition temperature (Tg) of 145° C. of Samsung SDI Inc., is used.
(b) Copper Halide Thermal Stabilizer
TP-H9008 product, a mixed compound of CuI/KI of Brueggemann Company, is used.
(c) Zeolite
APS-30, a zeolite product of AK ChemTech Co. Ltd., is used.
(d) Glass Fiber
983, a glass fiber product having a diameter of 10 μm, a chip length of 4 mm, and an oval cross-section of Owens Corning Company, is used.

The thermoplastic resin compositions according to the embodiments and comparative examples are produced in accordance with the component content (amount) ratios shown in table 1 below.

The components shown in table 1 are put into a mixer, and then dry-blended. Then, they are put into a twin-screw extruder having an L!D of 45 and ϕ of 45 mm, and through this extruder, a thermoplastic resin composition is produced in the form of pellets. From the produced pellets, a specimen is produced using an injection molder set up to 330° C. to evaluate properties.

The contents (amounts) of the components shown in table 1 are shown in units of weight % per 100 weight % of semi-aromatic polyamide resin, copper halide thermal stabilizer, zeolite and glass fiber.

TABLE 1

| Components | | (a-1) | (a-2) | (b) | (c) | (d) |
|---|---|---|---|---|---|---|
| Embodiments | 1 | 64.3 | — | 0.2 | 0.5 | 35 |
| | 2 | 63.8 | — | 0.2 | 1.0 | 35 |
| | 3 | — | 64.3 | 0.2 | 0.5 | 35 |
| | 4 | — | 63.8 | 0.2 | 1.0 | 35 |

TABLE 1-continued

| Components | | (a-1) | (a-2) | (b) | (c) | (d) |
|---|---|---|---|---|---|---|
| | 5 | 64.4 | — | 0.2 | 0.4 | 35 |
| Comparative examples | 1 | 60.8 | — | 0.2 | 4.0 | 35 |
| | 2 | 65.0 | — | — | — | 35 |
| | 3 | 64.8 | — | 0.2 | — | 35 |
| | 4 | — | 64.8 | 0.2 | — | 35 |
| | 5 | 64.0 | — | — | 1.0 | 35 |
| | 6 | 64.75 | — | 0.2 | 0.05 | 35 |
| | 7 | 58.8 | — | 0.2 | 6.0 | 35 |

The thermoplastic resin compositions according to embodiments 1 to 5 and comparative examples 1 to 7 are evaluated for the long term thermal stability and long term hydrolysis resistance. The evaluation methods used for the evaluation items are as explained below. Results of the evaluation on the long term hydrolysis resistance are shown in table 2 below, and results of the evaluation on the long term thermal stability are shown in table 3 below.

<Long Term Hydrolysis Resistance Evaluation>

A portion of each specimen produced for evaluation of hydrolysis resistance using the thermoplastic resin composition according to embodiments 1 to 5 and comparative examples 1 to 7 is left for 48 hours under a temperature of 23° C., and relative humidity of 50%, and then its initial tensile strength, $a_0$, is measured according to ASTM D638. Herein, the measurement speed of the tensile strength is 5 mm/min. Then, a portion of each of the remaining specimen is dipped into a solution where ethylene glycol and water is mixed by a volume ratio of 50:50 in an oven at 130° C. and then left for 500 hours, and then its tensile strength, $a_1$, is measured. The long term hydrolysis resistance is evaluated based on the tensile strength maintenance rate calculated using formula 3 shown below.

$$\frac{a_1}{a_0} \times 100(\%) \quad \text{[Formula 3]}$$

TABLE 3

| | | Initial tensile strength (kgf/cm$^2$) | Tensile strength (kgf/cm$^2$) after 500 hrs | Maintenance rate of tensile strength (%) |
|---|---|---|---|---|
| Embodiments | 1 | 2,071 | 1,638 | 79.1 |
| | 2 | 2,011 | 1,635 | 81.3 |
| | 3 | 2,123 | 1,620 | 76.3 |
| | 4 | 2,169 | 1,674 | 77.2 |
| | 5 | 2,151 | 1,618 | 75.2 |
| Comparative examples | 1 | 2,020 | 1,505 | 74.5 |
| | 2 | 2,060 | 1,450 | 70.4 |
| | 3 | 2,070 | 1,503 | 72.6 |
| | 4 | 2,149 | 1,391 | 64.7 |
| | 5 | 2,159 | 1,528 | 70.8 |
| | 6 | 2,020 | 1,390 | 68.8 |
| | 7 | 1,983 | 1,408 | 71.0 |

<Long Term Thermal Stability Evaluation>

A portion of each specimen produced for evaluation of the long term thermal stability using the thermoplastic resin composition according to embodiments 1 to 5 and comparative examples 1 to 7 is left for 48 hours under a temperature of 23° C., and relative humidity of 50%, and then its initial tensile strength, $a_0$, is measured according to ASTM D638. Herein, the measurement speed of the tensile strength is 5 mm/min. Then, a portion of each of the remaining specimen is left for 500 hours under 220° C., and then its tensile strength, $a_2$, is measured. The long term thermal stability is evaluated based on the tensile strength maintenance rate calculated using formula 4 shown below.

$$\frac{a_2}{a_0} \times 100(\%) \qquad \text{[Formula 4]}$$

TABLE 3

|  |  | Initial tensile strength (kgf/cm²) | Tensile strength (kgf/cm²) after 500 hrs | Maintenance rate of tensile strength (%) |
|---|---|---|---|---|
| Embodiments | 1 | 2,071 | 1,284 | 62.0 |
|  | 2 | 2,011 | 1,287 | 64.0 |
|  | 3 | 2,123 | 1,255 | 59.1 |
|  | 4 | 2,169 | 1,258 | 58.0 |
|  | 5 | 2,151 | 1,206 | 56.1 |
| Comparative examples | 1 | 2,020 | 1,171 | 58.0 |
|  | 2 | 2,060 | 1,080 | 52.4 |
|  | 3 | 2,070 | 1,140 | 55.1 |
|  | 4 | 2,149 | 1,245 | 57.9 |
|  | 5 | 2,159 | 1,166 | 54.0 |
|  | 6 | 2,020 | 1,071 | 53.0 |
|  | 7 | 1,983 | 1,189 | 60.0 |

Tables 1 to 3 show that the specimens produced from the thermoplastic resin compositions according to embodiments 1 to 5 of the present disclosure exhibit excellent long term thermal stability and hydrolysis resistance.

Furthermore, when the weight ratio of the copper halide thermal stabilizer to the zeolite is within the range of about 1:2 to about 1:15, the long term thermal stability and long term hydrolysis resistance are improved even more due to the synergy effects of the copper halide thermal stabilizer and the zeolite (Embodiments 1 to 5).

However, when more zeolite is added than the amount of the present disclosure (comparative examples 1 and 7), the initial tensile strength is lower than in the embodiments, and the long hydrolysis resistance slightly deteriorates as well.

Likewise, when zeolite is added in an amount that is less than the amount of the present disclosure (comparative example 6), there is insignificant improvement of the long term thermal stability, and the long term hydrolysis resistance is not good either.

When only copper halide thermal stabilizer is added to the thermoplastic resin composition (comparative examples 3 and 4), the long thermal stability and the long term hydrolysis resistance deteriorate more than in the embodiments, but when zeolite is used together with the copper halide thermal stabilizer, the long thermal stability and the long term hydrolysis resistance are excellent, proving that mechanical strength can be maintained for long periods of time stably.

Meanwhile, when only zeolite is added to the thermoplastic resin composition (comparative example 5), the maintenance rate of the tensile strength measured in the evaluation for the long term thermal stability and long term hydrolysis resistance is lower than in the embodiments.

Accordingly, the thermoplastic resin composition of the present disclosure wherein copper halide thermal stabilizer and zeolite are both used exhibit long term excellent hydrolysis resistance and long term thermal stability at high temperature environments.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A thermoplastic resin composition for automobiles, the composition comprising:
   about 40 to about 80 weight % semi-aromatic polyamide resin;
   about 0.1 to about 1 weight % copper halide thermal stabilizer;
   about 0.1 to about 5 weight % zeolite; and
   about 15 to about 55 weight % glass fiber.

2. The composition according to claim 1, wherein the semi-aromatic polyamide resin comprises a repeat unit comprising: a dicarboxylic acid unit including about 10 to about 100 mol % aromatic dicarboxylic acid and an aliphatic and/or alicyclic diamine unit.

3. The composition according to claim 1, wherein the semi-aromatic polyamide resin comprises a polyamide PA6T/66 and/or a polyamide PA6T/DT, wherein the polyamide PA6T/66 includes hexamethylene terephthalamide and hexamethylene adipamide and the polyamide PA6T/DT includes hexamethylene terephthalamide and 2-methylpentamethylene terephthalamide.

4. The composition according to claim 1, wherein the semi-aromatic polyamide resin has a glass transition temperature (Tg) of about 110 to about 160° C.

5. The composition according to claim 1, wherein a weight ratio of the copper halide thermal stabilizer to the zeolite is about 1:2 to about 1:15.

6. The composition according to claim 1, wherein the copper halide thermal stabilizer comprises copper chloride (I), copper bromide (I), copper iodide (I), copper chloride (II), copper bromide (II), and/or copper iodide (II).

7. The composition according to claim 1, wherein the zeolite has a specific surface area of about 300 to about 1,200 m²/g.

8. The composition according to claim 1, having a tensile strength $a_1$ with respect to an initial tensile strength $a_0$ measured according to ASTM D638 after being dipped into a mixture solution including a 50:50 volume ratio of ethylene glycol and water at 130° C. for 500 hours, expressed by formula 1:

$$75 \leq \frac{a_1}{a_0} \times 100 \leq 100 \qquad \text{[Formula 1]}$$

and
having a tensile strength $a_2$, with respect to an initial tensile strength $a_0$ measured according to ASTM D638 after being dipped into a mixture solution including a 50:50 volume ratio of ethylene glycol and water of 50:50 at 220° C. for 500 hours, expressed by formula 2:

$$55 \leq \frac{a_2}{a_0} \times 100 \leq 100. \qquad \text{[Formula 2]}$$

9. A molded product for automobiles produced from the thermoplastic resin composition of claim 1.

10. The molded product according to claim 9, comprising a component inside an under hood.

11. The molded product according to claim 9, comprising a battery fuse, turbo resonator, and/or intercooler tank.

* * * * *